Nov. 5, 1957  J. R. WILLIAMS  2,811,963
AUTOMOBILE HEATER ATTACHMENT FOR WARMING BOTTLES
Filed Dec. 30, 1954  2 Sheets-Sheet 1
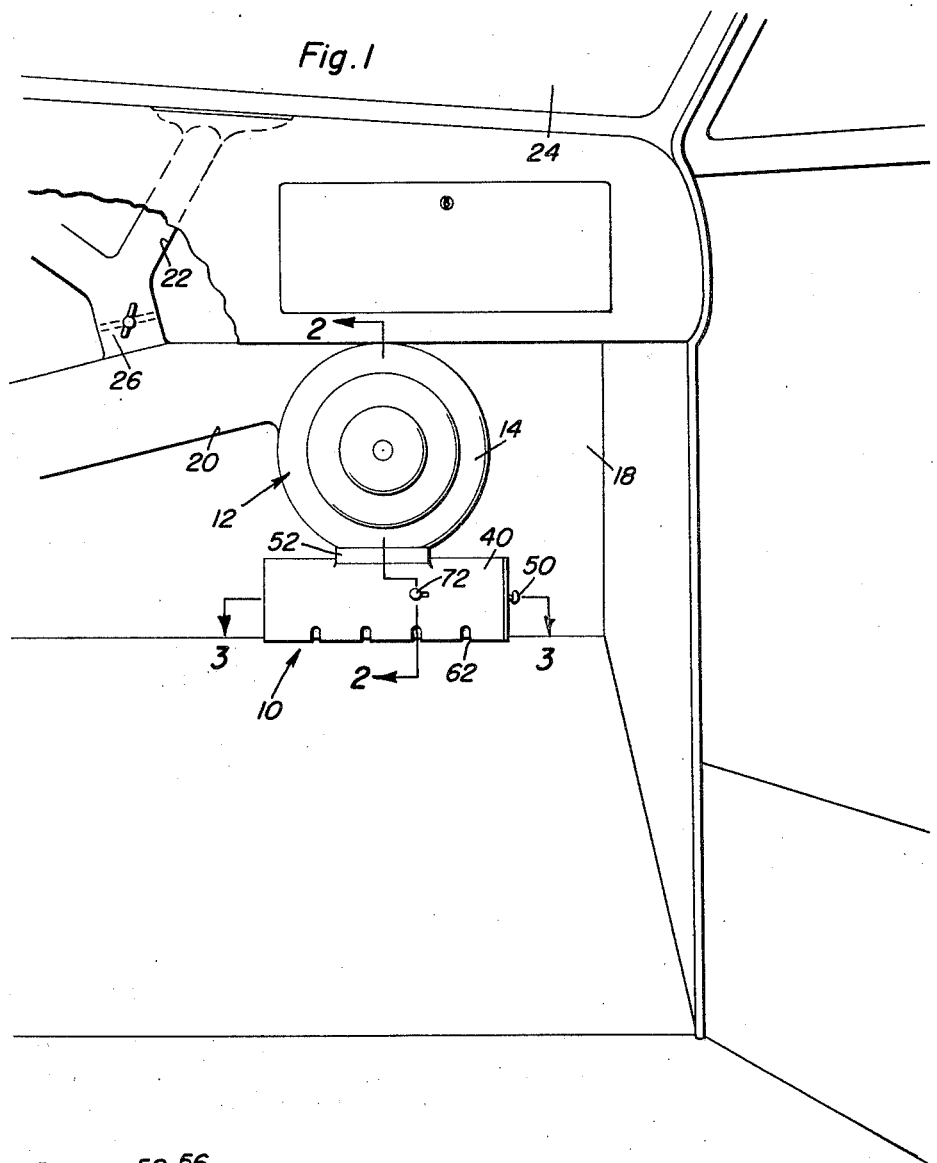
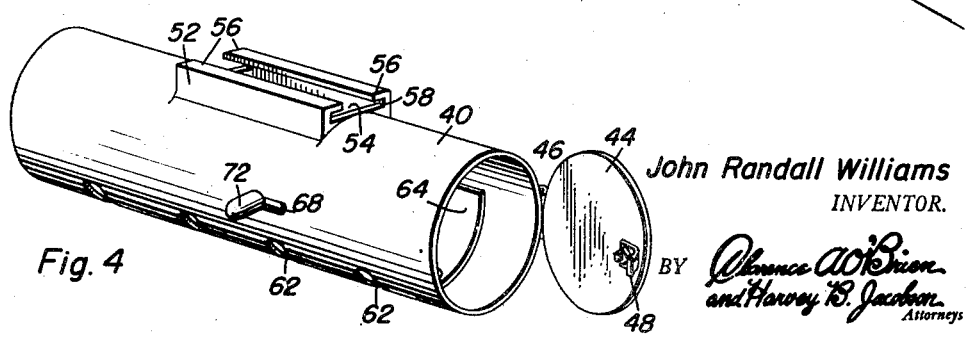
John Randall Williams
INVENTOR.

Nov. 5, 1957  J. R. WILLIAMS  2,811,963
AUTOMOBILE HEATER ATTACHMENT FOR WARMING BOTTLES
Filed Dec. 30, 1954  2 Sheets-Sheet 2
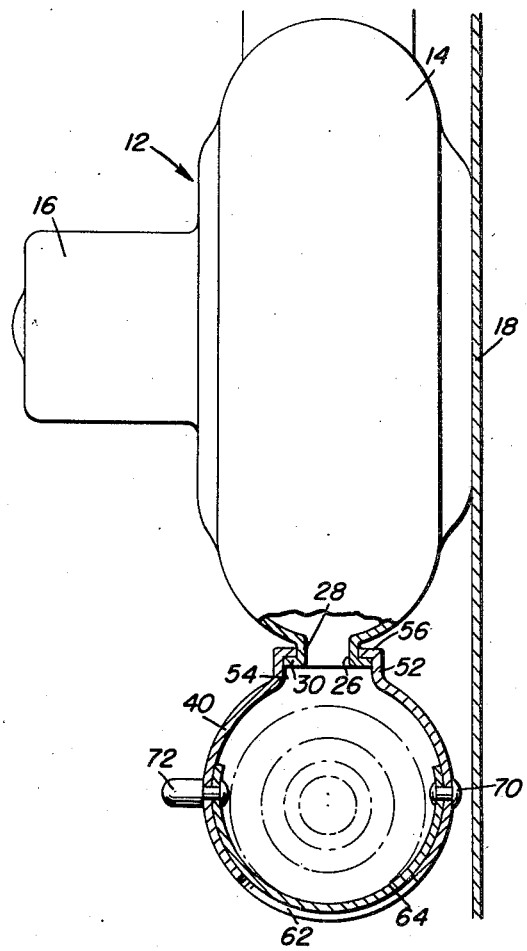
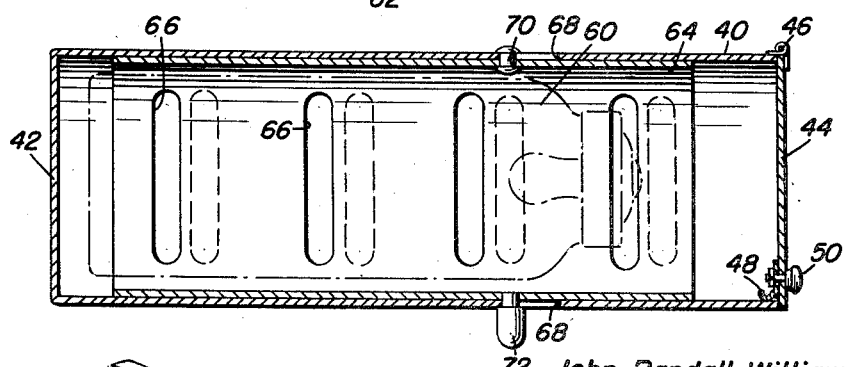
John Randall Williams
INVENTOR.

United States Patent Office 2,811,963
Patented Nov. 5, 1957

2,811,963

AUTOMOBILE HEATER ATTACHMENT FOR WARMING BOTTLES

John Randall Williams, Petersburg, Ind.

Application December 30, 1954, Serial No. 478,567

1 Claim. (Cl. 126—261)

This invention generally relates to a heating device, and more specifically provides an attachment for vehicle heaters for warming baby bottles during trips or the like.

In the operation and use of a vehicle, such as an automobile, it is frequently desirable to heat certain foods or drinks for one or more of the occupants during long trips. This is especially desirable when a small infant is on a long trip and it becomes desirable and necessary to heat the contents of the baby bottle for consumption by the infant. Heretofore, heaters for such liquids have been proposed which utilize electrical energy from the vehicle battery or electrical system. These prior devices have not found general use inasmuch as the electrical system of a vehicle is already excessively over-taxed, and the use of an electrical heater has not been found practical. Accordingly, it is the primary object of the present invention to provide an attachment for existing heaters found in automobiles which is simple in construction and easy to use for heating or warming baby bottles to a desired temperature for use by the infant.

Another important object of the present invention is to provide an attachment for automobile heaters having a source of hot air heat together with a fan mounted within a casing wherein a portion of the heated air is circulated through the warmer attachment for warming the bottle positioned therein.

Still another object of the present invention is to provide a baby bottle warmer that may be detachably secured to the heater of an automobile and the circulation of heated air therethrough may be easily controlled and regulated.

Still another important feature of the present invention is to provide a bottle warming attachment which may be detached from an automobile heater and a closure member positioned over an adapter opening in the casing or housing of the heater.

Other important objects of the present invention will reside in its simplicity of construction, ease of attachment to existing automobile heaters, efficiency in operation, its adaptation for its particular purpose, and its relatively inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing the baby bottle warmer of the present invention mounted upon a heater installed in an automobile;

Figure 2 is a vertical, sectional view, taken substantially upon a plane passing along section line 2—2 of Figure 1 showing the relationship of the heater attachment to the heater;

Figure 3 is a top plan sectional view taken substantially upon a plane passing along section line 3—3 of Figure 1, showing the details of construction of the warmer attachment;

Figure 4 is a perspective view showing the warmer attachment per se in detached relation; and Figure 5 is a perspective view showing a closure plate for mounting over the opening in the heater housing so that the operation of the heater will not be affected when the warmer attachment is removed.

Referring now specifically to the drawings, it will be seen that the numeral 10 generally designates the warmer attachment of the present invention that is adapted for detachable engagement with a heater generally designated by the numeral 12 and including a housing 14 and a driving motor 16. The heater 12 is mounted upon the usual dash or fire wall 18 and is provided with suitable discharge conduits 20 leading to branch conduits 22 that defrost the windshield 24. Suitable control valves 26 are provided in the conduit 22 for directing the discharge of air from the heater 12.

At the bottom of the casing 14 of the heater 12 is provided an elongated discharge opening 26 formed by a depending flange 28 which terminates in an outwardly projecting peripheral flange 30 which is subtantially rectangular in shape. Normally positioned over the opening 26 is a closure member generally designated by the numeral 32 and including a channel-shaped member 34 having inturned edge portions 36 which engages over the peripheral flange 30 for closing the opening 26. A suitable handle knob 38 is provided on the closure 32 for manipulation thereof.

The warmer attachment 10 includes generally an elongated cylindrical casing 40 having a closed end 42 at one end thereof and a pivotal closure member 44 at the other end thereof hingedly secured to one edge of the cylindrical casing 40 by hinge means 46. The other edge of the closure 44 is secured in closed relation by a frictional spring member 48 engaging the inner peripheral surface of the casing 40. An operating knob 50 is attached to the closure member 44 for opening and closing the same.

The cylindrical casing 40 is provided with integrally formed upstanding flanges 52 which generally form an inlet opening 54 and the flanges 52 are provided with inturned side edges 56 for forming notches or slots 58 which are adapted to slidably engage over the peripheral flange 30 of the opening 26 in the casing 14 of the heater 12, thereby detachably securing the casing 40 to the heater casing or housing 14. It will be seen that the aperture 54 is then aligned with the aperture 26 for permitting circulation of air from the housing 14 of the heater 12 into the interior of the casing 40 which receives a baby bottle 60 therein since the pivotal closure 44 permits access into the interior thereof.

On the bottom of the cylindrical casing 40 remote from the inlet opening 54 are a plurality of longitudinally spaced and arcuately elongated apertures 62 which permit discharge of air from the casing 40, thereby permitting circulation of heated air through the casing 40 and over the nursing bottle 60. Positioned within the casing 40 is a semi-cylindrical plate 64 that is provided with a plurality of longitudinally spaced and arcuately elongated slots 66 that are spaced a distance equal to the spacing of the slots 62 in the casing 40. When the apertures or slots 66 in the plate 64 are aligned with the apertures or slots 62 in the casing 40, heated air may circulate through the casing 40 and the circulation of such heated air may be controlled by longitudinal movement and adjustment of the semi-cylindrical plate 64. In order to retain the plate 64 in orientated position in the casing 40, the casing 40 is provided with oppositely disposed slots 68 therein for receiving a rivet 70 in one of the slots 68 and a handle member 72 in the other of the slots 68 wherein the rivet 70 and the handle member 72 are rigidly secured to the semi-cylindrical plate 64 wherein manipulation of the handle member 72 which projects exteriorly of the casing 40 will longitudinally adjust the plate 64, thereby selectively aligning the slots or apertures 66 and 62 or misaligning the slots or apertures 66 and 62, depending upon the requirements of the individual user, thereby permitting adjustment of the circulation of heated air through the casing 40 for determining the amount of heating to the baby bottle 60.

In operation, the warmer attachment 10 may be attached to the heater housing 14 in an obvious manner by engaging the inturned edges 56 over the peripheral flange 30, thereby communicating the interior of the casing 40 with the interior of the heater housing 14. The fan generally employed in the heater 12 will force hot air through the casing 40 and out through the discharge apertures 62. By controlling the longitudinal movement of the plate 64, the rate of flow of heated air through the casing 40 may be regulated for varying the heat on the baby bottle 60. When the warming attachment is not to be utilized for a while, it may be removed and the closure plate 32 installed therein with the inturned edges 36 engaging over the peripheral flange 30 in the usual manner.

While the device has been illustrated as being utilized on a certain type of heater, it will be readily understood that the device may be utilized on any type of heater having a source of heated air together with means for forcing the air through a discharge opening Preferably, a control valve may be provided in the usual discharge of the fan so that a greater amount of air may be forced through the warmer attachment 10 when and if desired. Also, the device may be utilized on heaters utilizing the engine cooling system as well as heaters utilizing hot air from the engine exhaust system or other sources. The device may be constructed of any suitable material lending itself to easy manufacturing and simplicity of construction as well as long lasting and rugged material.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A bottle warmer for attachment to a vehicle heater having a bottom heat discharge opening and flanges thereon at opposite sides of said opening, said warmer comprising a horizontal cylindrical casing having a top heat inlet opening therein, means on said casing at opposite sides of said heat inlet opening adapted to slidably engage with a heater whereby the heat inlet opening in said casing may register with the heat discharge opening in a heater, said casing having a bottom provided with transverse slots therein to permit passage of heat through said casing, an elongated transversely arcuate plate conformably fitting in and engaging the bottom of said casing with transverse slots therein, said plate being endwise slidable on said bottom to move the slots in the plate into and out of registration with the slots in said casing whereby to control passage of heat through said casing, said casing having a pair of longitudinal slots in opposite sides thereof between said top and bottom, said plate having a pin on one side and a plate sliding handle on the other side, said pin and handle slidably extending through said pair of slots to guide said plate in its sliding movement and maintain the plate engaged with said bottom.

References Cited in the file of this patent

UNITED STATES PATENTS

| | | |
|---|---|---|
| 92,543 | Reinhardt | July 13, 1869 |
| 353,181 | Evera | Nov. 23, 1886 |
| 651,952 | Pearlstine | June 19, 1900 |
| 1,105,136 | Harder | July 28, 1914 |
| 1,584,514 | Deeter | May 11, 1926 |
| 2,405,145 | Holthouse | Aug. 6, 1946 |

FOREIGN PATENTS

| | | |
|---|---|---|
| 617,429 | Germany | Aug. 19, 1935 |
| 706,599 | France | Mar. 31, 1931 |